United States Patent [19]

Nakashima et al.

[11] Patent Number: 4,750,858
[45] Date of Patent: Jun. 14, 1988

[54] WRIST ASSEMBLY FOR AN INDUSTRIAL ROBOT

[75] Inventors: Seiichiro Nakashima; Kenichi Toyoda; Akihiro Terada, all of Hino, Japan

[73] Assignee: Fanuc Ltd., Yamanashi, Japan

[21] Appl. No.: 768,537

[22] PCT Filed: Dec. 27, 1984

[86] PCT No.: PCT/JP84/00623
§ 371 Date: Aug. 19, 1985
§ 102(e) Date: Aug. 19, 1985

[87] PCT Pub. No.: WO85/02808
PCT Pub. Date: Jul. 4, 1985

[30] Foreign Application Priority Data

Dec. 27, 1983 [JP] Japan ............................... 58-244517

[51] Int. Cl.$^4$ ............................................. B66C 1/00
[52] U.S. Cl. ..................... 414/732; 901/21; 901/26; 901/29
[58] Field of Search ......... 901/21, 26, 27, 28, 901/29, 30; 414/735, 744 R, 732

[56] References Cited

U.S. PATENT DOCUMENTS 3,922,930 12/1975 Fletcher et al. ............ 901/28 X
4,030,617 6/1977 Richter .................. 901/26 X
4,417,845 11/1983 Burton .................. 901/26 X
4,496,278 1/1985 Kaise ................... 901/21 X
4,557,662 12/1985 Terauchi et al. ........... 901/14 X

FOREIGN PATENT DOCUMENTS 7801844 3/1978 Fed. Rep. of Germany .
51-104763 9/1976 Japan .
53-45987 12/1978 Japan .
55-20839 6/1980 Japan .
55-37394 9/1980 Japan .
770780 10/1980 U.S.S.R. ......................... 901/26

Primary Examiner—Robert J. Spar
Assistant Examiner—Jennifer Doyle
Attorney, Agent, or Firm—Armstrong, Nikaido, Marmelstein & Kubovcik

[57] ABSTRACT

The two-axes wrist assembly of the chain-drive system for an industrial robot has a base wrist unit (12) disposed on one side of the robot arm (11). A hollow shaft (13) is fixed at one end thereof to the base wrist unit and is supported at the same end on one side wall of the free end of the robot arm so as to be rotatable about a first axis ($\beta$) intersecting the longitudinal axis of the robot arm at right angles. The other end of the hollow shaft is positioned opposite to the inner surface of the other side wall of the free end of the robot arm. A fore wrist unit (16) is supported on the base wrist so as to be rotatable about a second axis ($\alpha$) intersecting the first axis at right angles. A through shaft (17) is provided rotatably within and coaxially with the hollow shaft. The fore wrist unit is interlocked with the hollow shaft by a pair of bevel gears (18, 19). A first sprocket (22) is provided on the other end of the hollow shaft coaxially with the same within the free end of the robot arm. A second sprocket (23) is disposed provided on and coaxially with the through shaft adjacent to the first sprocket within the free end of the robot arm. The first and second sprockets engage first an second chains (26, 27) for power transmission, respectively.

1 Claim, 2 Drawing Sheets

WRIST ASSEMBLY FOR AN INDUSTRIAL ROBOT

DESCRIPTION

1. Technical Field

The present invention relates to a wrist assembly for an industrial robot, and more particularly, to a two-axes wrist assembly of the chain-drive system.

2. Background Art

Generally, a two-axes wrist assembly provided at the free end of the robot arm of an industrial robot comprises a base wrist unit joined to the free end of the robot arm so as to be rotatable relative to the free end of the robot arm about a first axis intersecting the longitudinal axis of the robot arm at right angles, and a fore wrist unit joined to the base wrist unit so as to be rotatable relative to the base wrist unit about a second axis intersecting the first axis at right angles. The shaft-drive system and the chain-drive system have been well-known driving systems for driving the base wrist unit and the fore wrist unit of a wrist assembly of the above-mentioned type. Ordinarily, the shaft-drive system requires many power transmitting parts to transmit the rotation of two power transmitting shafts extended along the longitudinal direction of the robot arm through bevel gears to the base wrist unit and the fore wrist unit, which disadvantageously increases the total weight of the robot arm and the wrist assembly.

On the other hand, the chain-drive system is able to couple sprockets engaging chains directly with the base wrist unit, and hence only a reduced number of power transmitting parts are necessary and the robot arm and the wrist assembly can be formed in lightweight constructions.

Accordingly, chain-drive wrist assemblies have widely been employed recently in industrial robots.

A conventional ordinary chain-driven two-axes wrist assembly is shown in FIGS. 1 and 2. Referring to FIGS. 1 and 2, the wrist assembly of this type has a base wrist unit 2 which is provided, at the opposite sides thereof, with shafts 2a and 2b. The base wrist unit 2 is supported by the shafts 2a and 2b so as to be rotatable relative to the robot arm 1 about a first axis $\beta$ intersecting the longitudinal axis of the robot arm 1 at right angles. A fore wrist unit 3 is supported on the base wrist unit 2 so as to be rotatable about an axis $\alpha$ intersecting the first axis $\beta$ at right angles. A first sprocket 4 disposed on one side of the base wrist unit 2. A first chain 5 extended along one side of the robot arm 1 is wrapped round the sprocket 4. The other shaft 2b of the base wrist unit 2 is a hollow shaft. A shaft 6 supported coaxially with and within the hollow shaft 2b extends through the shaft 2b and is connected through a pair of bevel gears 7 and 8 to the fore wrist unit 3. A second sprocket 9 disposed on the other side of the base wrist unit 2 is attached to the shaft 6. A second chain 10 extended along the other side of the robot arm 1 is wrapped round the sprocket 9.

The wrist assembly of this constitution requires the chains 5 and 10 to be extended along the opposite sides of the robot arm 1 so as to correspond to the sprockets 4 and 9 disposed on the opposite sides of the base wrist unit 2, respectively. Therefore, the thickness of the robot arm needs to be increased in order to accommodate the chains 5 and 10 therein, and hence the sizes of the components for supporting the robot arm 1 need to be enlarged. To make the robot arm 1 capable of motion about the longitudinal axis thereof, in particular, it is a general practice to provide the robot arm 1 with a gear in the form of a flange and to transmit the driving force of a motor to the gear. In such a case, the enlargement of the thickness of the robot arm 1 entails the enlargement of the diameter of the gear.

Furthermore, since the base wrist unit 2 of the wrist assembly of the above-mentioned constitution is supported on the opposite sides thereof on the free end of the robot arm 1, the range of motion of the base wrist unit 2 is liable to be restricted by the robot arm 1, which results in the degradation of the kinematic functions of the wrist assembly.

DISCLOSURE OF THE INVENTION

It is an object of the present invention to provide a compact and lightweight wrist assembly for an industrial robot, capable of being associated with a compact and lightweight robot arm and having improved kinematic functions.

The present invention provides a wrist assembly for an industrial robot, comprising: a base wrist unit disposed on one side of the free end of a robot arm and having a hollow shaft supported on the free end of the robot arm so as to be rotatable relative to the robot arm about a first axis intersecting the longitudinal axis of the robot arm at right angles; a fore wrist unit supported on the base wrist unit so as to be rotatable about a second axis intersecting the first axis at right angles; a through shaft inserted through and coaxially with the hollow shaft so as to be rotatable and connected through bevel gears to the fore wrist unit; and sprockets disposed adjacent to each other within the free end of the robot arm to transmit driving forces to the hollow shaft and the through shaft respectively.

The sprockets for transmitting rotative power to the base wrist unit and the fore wrist unit of the wrist assembly for an industrial robot, according to the present invention, are disposed adjacent to each other within the free end of a robot arm. Therefore, the chains for transmitting rotative power to the sprockets can be extended adjacent to each other in the central portion of the robot arm. Accordingly, the robot arm may be a thin robot arm, and hence the respective sizes and weights of the robot arm and the parts of the robot arm supporting mechanism can be reduced. This merit of the present invention is extremely advantageous, particularly in making the robot arm capable of motion about the longitudinal axis thereof.

Furthermore, in the wrist assembly according to the present invention, since the base wrist unit is disposed on one side of a robot arm, the base wrist unit is able to rotate unrestrictedly about the first axis intersecting the longitudinal axis of the robot arm at right angles, without interfering with the robot arm, and hence the range of freedom of motion of the base wrist unit is expanded.

These and other objects and features of the present invention will become more apparent from the following detailed description of a preferred embodiment of the present invention taken in conjunction with the accompanying drawings.

BEST MODE FOR CARRYING OUT THE INVENTION

Figure 1:
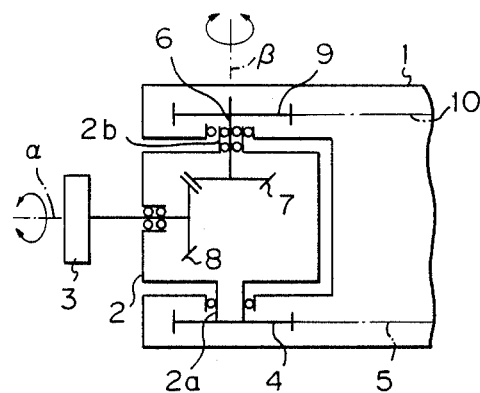
FIG. 1 is a schematic diagrammatic view in section showing a conventional two-axes wrist assembly for an industrial robot.
Figure 2:
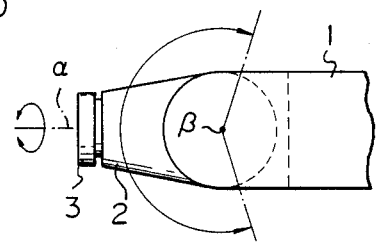
FIG. 2 is a side elevation of the wrist assembly of FIG. 1.
Figure 3:
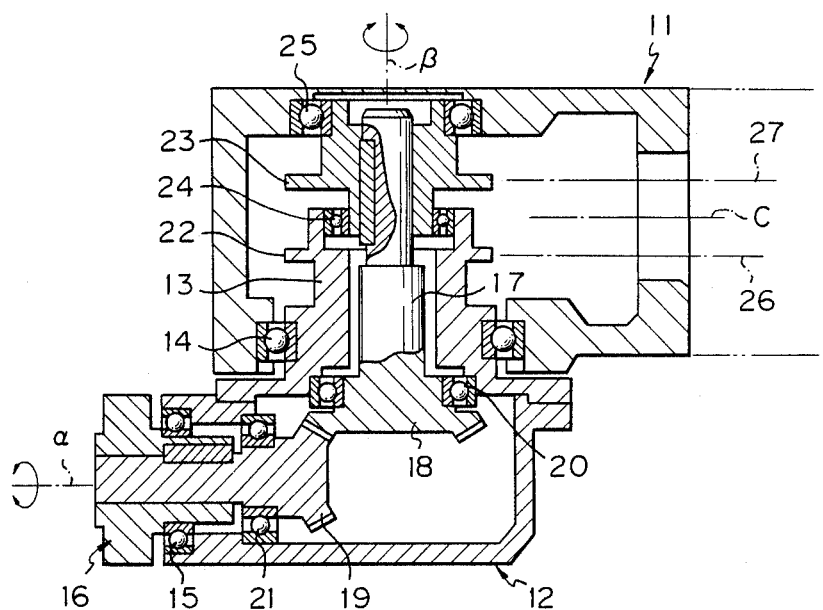
FIG. 3 is a sectional view of a two-axes wrist assembly for an industrial robot, in a preferred embodiment according to the present invention.
Figure 4:
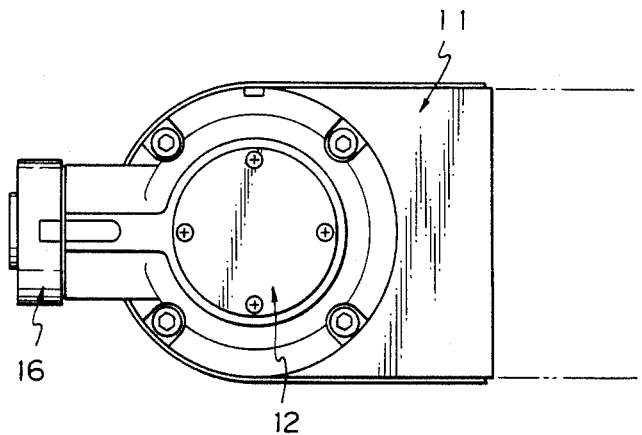
FIG. 4 is a side elevation of the wrist assembly of FIG. 3.
Figure 5:
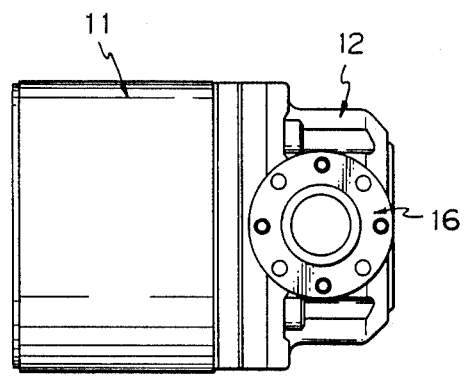
FIG. 5 is a front elevation of the wrist assembly of FIG. 3.

Referring to FIGS. 3 to 5, a base wrist unit 12 is disposed on one side of the free end of the robot arm 11 of an industrial robot. The base wrist unit 12 has a hollow shaft 13 supported on the free end of the robot arm 11 so as to be rotatable in a bearing 14 relative to the free end of the robot arm 11 about a first axis β intersecting the longitudinal axis of the robot arm 11 at right angles.

A fore wrist unit 16 is supported on the base wrist unit 12 so as to be rotatable in a bearing 15 about a second axis α intersecting the first axis β at right angles.

A through shaft 17 is inserted coaxially with and through the hollow shaft 13 so as to be rotatable therein. The through shaft 17 is connected through a pair of bevel gears 18 and 19 to the fore wrist unit 16. The bevel gears 18 and 19 are supported on the base wrist unit 12 so as to be rotatable in bearings 20 and 21, respectively.

A first sprocket 22 for transmitting rotative power to the hollow shaft 13 and a second sprocket 23 for transmitting rotative power to the through shaft 17 are disposed side by side within the free end of the robot arm 11. In this embodiment, the first sprocket 22 is formed integrally with the hollow shaft 13, and hence the same is rotatable about the axis β. The second sprocket 23 is keyed to the through shaft 17 and supported on the hollow shaft 13 and the robot arm 11 by bearings 24 and 25, respectively, so as to be rotatable about the axis β.

According to the present invention, the sprockets 22 and 23 for transmitting rotative power to the base wrist unit 12 and the fore wrist unit 16 of the wrist assembly, respectively, are disposed adjacent to each other. Consequently, a first chain 26 and a second chain 27 for transmitting rotative power to the sprockets 22 and 23, respectively, can be extended adjacent to each other in the central portion of the robot arm 11, and hence the robot arm 11 may be a thin robot arm, which is extremely advantageous for making the robot arm 11 capable of kinematic function about the longitudinal axis thereof.

In this wrist assembly, the base wrist unit 12 is disposed on one side of the robot arm 11. Therefore, the base wrist unit is allowed to rotate over a wide range of rotation, for example, an angular range of 360 degrees, about the first axis β without interfering with the robot arm 11. Accordingly, the range of motion of the base wrist unit 12 can be expanded.

Although the present invention has been described hereinbefore with reference to a preferred embodiment thereof, the present invention is not limited to the above-mentioned embodiment, but may be embodied in various modifications without departing from the scope of the following claims. For example, the first sprocket and the hollow shaft may be formed separately and joined together. Furthermore, it is possible to form the second sprocket integrally with the through shaft and to form the bevel gear separately from the through shaft.

CAPABILITY OF EXPLOITATION IN INDUSTRY

The wrist assembly according to the present invention is applicable to industrial robots for various work such as assembling parts, welding, and painting. Since the present invention enables the reduction of the size and weight of the robot arm as well as those of the wrist assembly, the range of motion of the wrist assembly is expanded, which enables the industrial robot to work in a narrow space.

We claim:

1. A wrist assembly for an industrial robot having a hollow robot arm, said hollow robot arm having at a free end thereof opposite side walls for defining therebetween an interior of said hollow robot arm, one of said side walls having a through hole extending in a direction perpendicular to a longitudinal axis of said hollow robot arm, said wrist assembly comprising:

a base wrist unit disposed outside said one of said side walls of said hollow robot arm;

a hollow shaft fixed at one end thereof to the base wrist unit and inserted through said through hole of said one of said side walls into said interior of said hollow robot arm with the other end thereof positioned opposite to the inner surface of another one of said side walls of said hollow robot arm, said hollow shaft being rotatably supported on an inner surface of said through hole in a first bearing member so as to be rotatable about a first axis intersecting said longitudinal axis of said hollow robot arm at right angles, said hollow shaft rotating said base wrist unit about said first axis;

a fore wrist unit supported on said base wrist unit and rotatable about a second axis intersecting said first axis at right angles;

a through shaft inserted coaxially with and through said hollow shaft rotatably supported on an inner surface of said hollow shaft in a second bearing member, said through shaft rotating said fore wrist unit about said second axis;

a pair of bevel gears disposed within said fore wrist unit an interlocking said through shaft with said fore wrist unit for rotation about said second axis, one of said bevel gears being formed integrally with said through shaft;

a first sprocket formed on said other end of and coaxially with said hollow shaft in said interior of said hollow robot arm and engaging a first chain for power transmission for rotating said base wrist unit about said first axis; and a second sprocket fixedly fitted on and coaxial with said through shaft adjacent to said first sprocket within said interior of said hollow robot arm and engaging a second chain for power transmission for rotating said fore wrist unit about said second axis, said second sprocket being rotatably supported on the inner surface of said hollow shaft and a cylindrical recess formed in the inner surface of said another one of said side walls on third and fourth bearing members, respectively, wherein the respective outside diameters of said first and second sprockets and said fourth bearing member are smaller than the inside diameter of said through hole formed in said one of said side walls of said hollow robot arm so that said first and second sprockets and said third bearing member can be inserted into and withdrawn from said interior of said hollow robot arm through said through hole.

* * * * *